Patented Jan. 29, 1935

1,989,570

UNITED STATES PATENT OFFICE 1,989,570

CHROMIFEROUS DYESTUFF AND PROCESS OF MAKING SAME

Fritz Straub, Basel, and Hermann Schneider, Riehen, near Basel, Switzerland, assignors to Society of Chemical Industry in Basle, Basel, Switzerland No Drawing. Application April 16, 1934, Serial No. 720,908. In Switzerland April 21, 1933

14 Claims. (Cl. 260—12)

This invention relates to the manufacture of chromiferous dystuffs by treating azo-dyestuffs capable of being chromed with such quantities of alkaline solutions of chromium oxide as contain for each group capable of being chromed in the azo-dyestuff less than 1 atom of chromium.

The parent material for the invention may be a single azo-dyestuff capable of being chromed or a mixture of two or more such azo-dyestuffs. These dyestuffs may be made, for example, from diazotized aromatic amines of the benzene and naphthalene series and any desired coupling components, such as, for example, arylamines, phenols, or compounds whose coupling carbon atom belongs to a heterocyclic ring or an open chain. Coupling components whose coupling carbon atom belongs to a heterocyclic ring are, for example, pyrazolones, hydroxyquinolines and barbituric acids, whereas acetoacetic acid derivatives and benzoyl-acetic-ortho-carboxylic acids represent such coupling components whose coupling carbon atom belongs to an open chain.

The treatment of the azo-dyestuffs capable of being chromed with such quantities of alkaline solutions of chromium oxide, (alkali chromite or alkaline earth chromite), which contain less than one atom of chromium for each group of the azo-dyestuff capable of being chromed may be conducted in the open or under pressure, in the presence or absence of a suitable addition, for instance of a soluble inorganic or organic salt or another substance.

Of especial value are the chromiferous dyestuffs made from azo-dyestuffs capable of being chromed of the general formula

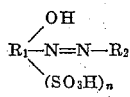

wherein $R_1$ is a naphthalene radical, $R_2$ a naphthol radical, and $n$ is 1 to 3, and wherein the hydroxyl- and the azo- groups stand in ortho-position to each other.

The azo-dyestuffs capable of being chromed of the above formula are obtained, for example, from diazotized 1-amino-2-hydroxynapthalene-4-sulfonic acid, diazotized 2-amino-1-hydroxynaphthalene-4-sulfonic acid, 6-bromo- or 6-chloro- or 6-nitro-1-diazo-2-hydroxynaphthalene-4-sulfonic acid, diazotized 2-amino-1-hydroxynaphthalene-4, 6-disulfonic acid, diazotized 2-amino-1-hydroxynaphthalene-4, 8-disulfonic acid and 1- or 2-hydroxynaphthalenes, as well as the substitution products thereof, such as, for example, chloro-, bromo-, methyl- and alkoxy-hydroxynaphthalenes. In these cases there may be obtained such chromiferous dyestuffs dyeing navy blue which, as compared with dyestuffs of this group hitherto known and dyeing similar tints, are level even in dyeing deep tones and are fast in every respect.

The process of the invention may be performed in a very simple manner by uniting the manufacture of the azo-dyestuff capable of being chromed and its treatment with the alkaline solution of chromium oxide in a single stage; thus, the coupling of the diazo-compound with the coupling component may occur in presence of the alkaline solution of chromium oxide and then may follow the chroming of the azo-dyestuff thus obtained, without separation, by heating to completion.

The dyestuffs obtainable by the invention are characterized by very good solubility in water. They are suitable for dyeing animal fibres, such as wool and silk. In dyeing wool it is of advantage to use the process described in Patent No. 1,903,884 or dye-baths containing an aromatic acid besides an inorganic acid.

The following examples illustrate the invention, the parts being by weight:—

Example 1

Into a chromite solution made from 444 parts of a fresh chromium hydroxide paste of 12 per cent. strength and 480 parts of potassium hydroxide of 90 per cent. strength are introduced, while stirring, 416 parts of the azo-dyestuff of the formula

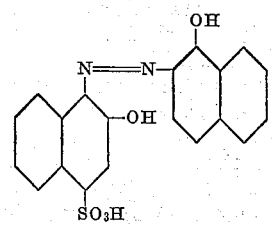

from diazotized 1-amino-2-hydroxynaphthalene-4-sulfonic acid and 1-hydroxynaphthalene and the whole is heated for 6–8 hours at 74–78° C. The blackish-blue mass is then diluted with water, neutralized with dilute mineral acid, filtered from impurities and the filtrate evaporated to dryness in a vacuum.

Instead of evaporating to dryness in a vacuum the filtrate may be concentrated in a vacuum and, in case the whole of the dyestuff has not separated, separation may be completed by salting out.

Example 2

In 400 parts of caustic soda solution of 30 per cent. strength there are dissolved at 60–70° C. while stirring well, 203 parts of fresh chromium hydroxide paste precipitated in the cold, corresponding with 15 per cent. of $Cr_2O_3$; to this mixture are added 204 parts of the azo-dyestuff of the formula

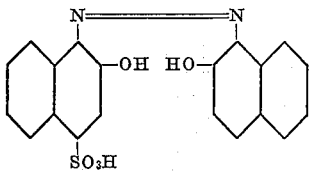

from diazotized 1-amino-2-hydroxynaphthalene-4-sulfonic acid and 2-hydroxynaphthalene in the form of a paste of about 40 per cent. strength and the whole is heated for 7-8 hours at 75-78° C. The blackish-blue mass is diluted with water to about 1500 parts, cautiously neutralized with mineral acid of 10 per cent. strength and then feebly acidified with acetic acid and filtered from impurities; the new chromiferous dyestuff is finally salted out.

It is a voilet-black powder, easily soluble in water; it dyes wool in an acid bath navy blue tints of excellent fastness.

Example 3

A fresh chromium hydroxide paste of about 13 per cent. strength containing 21.3 parts of $Cr_2O_3$ is cautiously stirred with 90 parts of potassium hydroxide. When the potassium hydroxide has dissolved there are added 150 parts of caustic soda solution of 30 per cent. strength and the whole is heated to 60-70° C. until all the chromium has been dissolved. While stirring there are introduced into the mixture 83.2 parts of the azo-dyestuff from diazotized 1-amino-2-hydroxynaphthalene - 4 - sulfonic acid and 1-hydroxynaphthalene, together with 83.2 parts of the azo-dyestuff from diazotized 1-amino-2-hydroxynaphthalene - 4 - sulfonic acid and 2-hydroxynaphthalene, and the temperature is kept for 6-8 hours at 75-78° C. Hereafter in manner analogous to that described in Examples 1 and 2, follow dilution with water, neutralization, filtration and evaporation in a vacuum or salting out of the dyestuff. The new chromiferous dyestuff is freely soluble in water to a blue solution and is suitable for producing fast navy blue tints on wool.

Instead of the finished azo-dyestuffs, the latter can be produced in the potassium chromite solution in known manner by dissolving both coupling components 1- and 2-hydroxynaphthalene in the chromite solution and then coupling with diazotized 1 - amino-2-hydroxynaphthalene - 4-sulfonic acid.

Example 4

To a potassium chromite solution made from 174 parts of fresh chromium hydroxide paste, corresponding with 14 per cent. of $Cr_2O_3$, and 200 parts of potassium hydroxide of 90 per cent. strength, there are added, while stirring, 124.8 parts of the azo-dyestuff from diazotized 1-amino-2-hydroxynaphthalene-4-sulfonic acid and 2-hydroxynaphthalene, as well as 40.2 parts of the azo-dyestuff of the formula

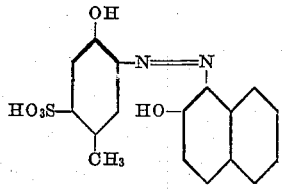

from 1-hydroxy - 2 - amino-4-methylbenzene-5-sulfonic acid and 2-hydroxynaphthalene. The mixture is heated for 4-6 hours at 75-78° C. and then diluted with water to about 1,000 parts by volume, cautiously neutralized with mineral acid and precipitated after filtration from impurities by addition of common salt, the new chromiferous dyestuff being then separated.

It dissolves easily in water to a violet-blue solution and dyes wool in a bath acid with organic acid and sulfuric acid navy blue tints of very good fastness.

Example 5

20.8 parts of the azo-dyestuff from diazotized 1-amino-2-hydroxynaphthalene-4-sulfonic acid and 2-hydroxynaphthalene are introduced into a freshly prepared chromite solution made by dissolving 30.9 parts of a chromium hydroxide paste of 8 per cent. strength, corresponding with 2.47 parts of $Cr_2O_3$, by means of 6.5 parts of caustic soda and 9.1 parts of caustic potash. The mixture is heated for 6 hours at 74-78° C. and then further for 6 hours at 85-90° C. 200 parts of hot water are now added, any undissolved constituents are separated by filtration and the filtrate is neutralized with dilute mineral acid and the chromiferous dyestuff is salted out. When dry it is a black powder soluble in water and in sodium carbonate solution of 10 per cent. strength to a violet blue solution, in caustic soda solution of 10 per cent. strength to a violet solution and in concentrated sulfuric acid to a blue solution. It dyes wool in a bath acid with organic acid and sulfuric acid navy blue tints of excellent properties.

Example 6

Into a chromite solution freshly prepared in the usual manner by stirring in the heat a mixture of 32.4 parts of a chromium hydroxide paste corresponding to 2.59 parts of $Cr_2O_3$, and 19.0 parts of caustic potash, there are introduced 19.0 parts of the azo-dyestuff from diazotized 1-hydroxy-2-amino-4-methyl-benzene-6-sulfonic acid and 2-hydroxynaphthalene. The reaction mixture is heated, while stirring, for 6 hours to 74-78° C. and for another 6 hours at 85-90° C. The whole is then diluted with hot water to 250 parts, if necessary filtered from any undissolved matter, the filtrate neutralized with dilute mineral acid and evaporated to dryness in the vacuum. The new chromiferous dyestuff represents a black powder dissolving in water and soda solution of 10 per cent. strength to violet, in sodium hydroxide solution of 10 per cent. strength to red-violet, and in concentrated sulfuric acid to blue-violet solutions, and dyeing wool in a sulfuric acid bath containing organic acid violet tints of very good fastness properties.

Example 7

33.3 parts of a chromium hydroxide paste of 8 per cent. strength, corresponding with 2.66 parts of $Cr_2O_3$, are stirred with 19.6 parts of caustic potash at 60-70° C. until a clear solution is produced. Into this solution are introduced 10.4 parts of the azo-dyestuff from diazotized 1-amino-2-hydroxynaphthalene-4-sulfonic acid and 2-hydroxynaphthalene and 10.4 parts of the azo-dyestuff from diazotized 1-amino-2-hydroxynaphthalene-4-sulfonic acid and 1-hydroxynaphthalene. The mixture is heated while well stirring for 6 hours at 74-78° C. and for another 6 hours at 90° C. It is then diluted with 300 parts of hot water and cautiously neutralized with dilute hydrochloric acid. The new chromiferous dyestuff is salted out, filtered and dried. It is a grey black powder, soluble in water and in sodium carbonate solution of 10 per cent. strength to reddish-blue solutions and in caustic soda solution of 10 per cent strength to a violet solution. In concentrated sulfuric acid it dissolves to a green blue solution. It dyes wool in a bath acid with organic acid and sulfuric acid excellent, fast navy blue tints.

Example 8

Into a chromite solution freshly prepared in the usual manner by stirring at 60–70° C. a mixture of 33.0 parts of a chromium hydroxide paste corresponding to 3.04 parts of $Cr_2O_3$, 11.2 parts of caustic potash and 8.0 parts of caustic soda, there are introduced 43 parts of the azo-dyestuff of the formula

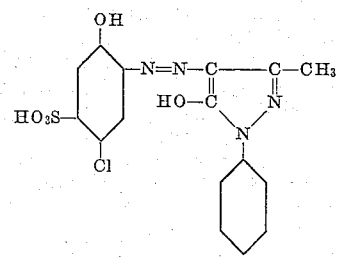

from diazotized 4-chloro-2-amino-1-phenol-5-sulfonic acid and 1-phenyl-3-methyl-5-pyrazolone dissolved in 400 parts of water. The mixture is heated while stirring for 6 hours to 74–78° C. and then for 24 hours to the boil. The whole is then diluted with 100 parts of hot water, if necessary filtered from any undissolved matter, and the filtrate cautiously neutralized with dilute hydrochloric acid. The dyestuff is separated by addition of common salt, filtered and dried. It represents a red-brown powder dissolving in water and sodium carbonate solution of 10 per cent. strength to orange-red, in caustic soda solution of 10 per cent. strength to orange, and in concentrated sulfuric acid to yellow-orange solutions, and dyeing wool in a sulfuric acid bath containing organic acid red tints of very good fastness properties.

If the dyestuff from diazotized 4-chloro-2-amino-1-phenol-6-sulfonic acid and 1-phenyl-3-methyl-5-pyrazolone is treated in an analogous manner, there is obtained a chromium compound which also dyes wool in a sulfuric acid bath containing organic acid red tints.

Example 9

In an iron vessel 30.9 parts of a chromium hydroxide paste of 8 per cent. strength, corresponding with 2.47 parts of $Cr_2O_3$, are dissolved by means of 18.2 parts of caustic potash of 60–70° C. and there are added 7.55 parts of 2-hydroxynaphthalene and, after cooling to 15° C. 12.5 parts of diazotized 1-amino-2-hydroxynaphthalene-4-sulfonic acid; the whole is then heated at 30–35° C. until the diazo-compound has disappeared, whereupon the temperature is raised to 74–78° C. while stirring and maintained thereat for 12 hours. After this period the mass is diluted with 300 parts of cold water, cautiously neutralized with dilute hydrochloric acid and salted out. The dyestuff thus obtained is a violet-black powder when dry and dissolves in water and in sodium carbonate solution of 10 per cent strength to a reddish blue solution; in caustic soda solution of 10 per cent strength to a blue-violet solution and in concentrated sulfuric acid to a pure blue solution. It dyes wool in a bath acid with organic acid and sulfuric acid navy blue tints of excellent properties.

Example 10

66.6 parts of a chromium hydroxide paste of 8 per cent. strength, corresponding with 5.32 parts of $Cr_2O_3$, are dissolved by means of 7 parts of caustic soda and 29.4 parts of caustic potash at 60–70° C. and there are added, while stirring 15.1 parts of 2-hydroxynaphthalene; after cooling to 15° C. there are added 27.6 parts of diazotized 1-amino-2-hydroxynaphthalene-4-sulfonic acid and the whole is heated at 30–35° C. until the diazo-compound has disappeared. The mixture is now heated for 12 hours at 74–78° C. then diluted with 600 parts of cold water and cautiously neutralized with dilute hydrochloric acid. The new chromiferous dyestuff is now salted out. When dry it is a violet-black powder, soluble in water and in sodium carbonate solution of 10 per cent. strength to a reddish-blue solution; in caustic soda solution of 10 per cent. strength to a blue-violet solution and in concentrated sulfuric acid to a green-blue solution. It dyes wool in a bath acid with organic acid and sulfuric acid navy blue tints of excellent properties.

Example 11

Into 38 parts of a chromium hydroxide paste of 8 per cent. strength, corresponding with 3.04 parts of $Cr_2O_3$, are introduced 22.4 parts of caustic potash and the mixture is stirred at 60–70° C. until the chromium hydroxide has dissolved completely; there are then added 3.8 parts of 1-hydroxynaphthalene and 3.8 parts of 2-hydroxynaphthalene and the whole is cooled to 15° C. There are now introduced 12.5 parts of diazotized 1-amino-2-hydroxynaphthalene-4-sulfonic acid and the whole is heated at 30–35° C. until the diazo-compound has disappeared. The mixture is now heated for 12 hours at 74–78° C., then diluted with 300 parts of water, cautiously neutralized with dilute hydrochloric acid and mixed with common salt to salt out the chromiferous dyestuff. The latter when dry is a violet-black powder soluble in water and in sodium carbonate solution of 10 per cent. strength to a reddish-blue solution; in caustic soda solution of 10 per cent. strength to a blue-violet solution and in concentrated sulfuric acid to a blue-green solution. It dyes wool in a bath acid with organic acid and mineral acid navy blue tints of good properties.

Example 12

Into a chromite solution freshly prepared by stirring at 60–70° C. a mixture of 42.8 parts of a chromium hydroxide paste corresponding to 3.42 parts of $Cr_2O_3$ and 25.2 parts of caustic potash, there are introduced 20.9 parts of the azo-dyestuff of the formula

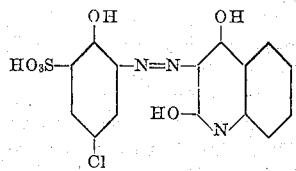

from diazotized 4-chloro-2-amino-1-phenol-6-sulfonic acid and 2:4-dihydroxyquinoline. The reaction mixture is heated while stirring for 6 hours at 74–78° C., diluted with 200 parts of water and heated for a further 12 hours to the boil. The whole is then filtered if necessary to remove any undissolved constituents the filtrate neutralized with dilute mineral acid, and the chromiferous dyestuff separated by addition of common salt. When dry, the latter represents a brown-black powder dissolving in water, sodium carbonate solution of 10 per cent. strength, and caustic soda solution of 10 per cent. strength to red and in concentrated sulfuric acid to orange solutions. The dyestuff dyes wool from a mineral acid bath containing organic acid Bordeaux-red tints of excellent fastness properties.

*Example 13*

7.3 parts of the azo-dyestuff from diazotized 1-amino-2-hydroxynaphthalene-4-sulfonic acid and 1-hydroxynaphthalene, 7.3 parts of the azo-dyestuff from diazotized 1-amino-2-hydroxynaphthalene-4-sulfonic acid and 2-hydroxynaphthalene and 7.4 parts of the azo-dyestuff of the formula

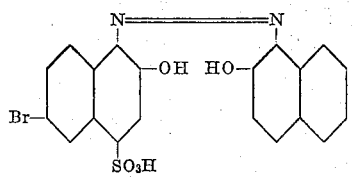

from diazotized 6-bromo-1-amino-2-hydroxynaphthalene-4-sulfonic acid and 2-hydroxynaphthalene are introduced into a freshly prepared chromite solution, made by dissolving 35.6 parts of a chromium hydroxide paste of 8 per cent. strength, corresponding with 2.85 parts of $Cr_2O_3$, by means of 21 parts of caustic potash. The mixture is heated, while stirring for 6 hours at 74–78° C., and for the further 8 hours at 85–90° C. It is then diluted with 300 parts of hot water, any undissolved constituents are filtered, the filtrate is cautiously neutralized with dilute mineral acid and the chromiferous dyestuff salted out. When dry it is a grey-black powder, soluble in water to a reddish-blue solution, in sodium carbonate solution of 10 per cent. strength to a blue-violet solution, in caustic soda solution of 10 per cent. strength to a violet solution and in concentrated sulfuric acid to a green-blue solution. It dyes wool in a bath acid with organic acid and mineral acid navy blue tints of excellent properties.

*Example 14*

35.6 parts of a chromium hydroxide paste of 8 per cent. strength, corresponding with 2.85 parts of $Cr_2O_3$, are stirred with 21 parts of caustic potash at 60–70° C., until complete dissolution has occurred. Into this solution are introduced 7.3 parts of the azo-dyestuff from diazotized 1-amino-2-hydroxynaphthalene-4-sulfonic acid and 1-hydroxynaphthalene, 7.3 parts of the azo-dyestuff from diazotized 1-amino-2-hydroxynaphthalene-4-sulfonic acid and 2-hydroxynaphthalene and 7.4 parts of the azo-dyestuff from diazotized 6-bromo-1-amino-2-hydroxynaphthalene-4-sulfonic acid and 2-hydroxynaphthalene, and a further 12 parts of crystallized sodium sulfate. The mixture is heated, while stirring well, for 6 hours at 74–78° C. and then for 8 hours at 85–90° C.; then diluted with cold water to make 300 parts and neutralized with dilute hydrochloric acid. The chromiferous dyestuff is then salted out, filtered and dried. It is a violet-black powder soluble in water and in sodium carbonate solution of 10 per cent. strength to a reddish blue solution, in caustic soda solution of 10 per cent. to a blue violet solution and in concentrated sulfuric acid to a green-blue solution. It dyes wool in a bath acid with organic acid and mineral acid excellent fast navy blue tints.

*Example 15*

Into a freshly prepared chromite solution, made by stirring, at 60–70° C., 35.6 parts of a chromium hydroxide paste of 8 per cent. strength, corresponding with 2.85 parts of $Cr_2O_3$, with 21 parts of caustic potash, are introduced 7.3 parts of the azo-dyestuff from diazotized 1-amino-2-hydroxynaphthalene-4-sulfonic acid and 1-hydroxynaphthalene, 7.3 parts of the azo-dyestuff from diazotized 1-amino-2-hydroxynaphthalene-4-sulfonic acid and 2-hydroxynaphthalene and 7.4 parts of the azo-dyestuff from diazotized 6-bromo-1-amino-2-hydroxynaphthalene-4-sulfonic acid and 2-hydroxynaphthalene, as well as 5 parts of sodium oxalate. The mixture is heated, while stirring for 6 hours at 74–78° C. and then for a further 8 hours at 85–90° C. It is then diluted to 300 parts with cold water, neutralized with dilute hydrochloric acid and the dyestuff is salted out. When dry the dyestuff is a violet-black powder, soluble in water and in sodium carbonate solution of 10 per cent. strength to a reddish blue solution, in caustic soda solution of 10 per cent. strength to a blue-violet solution and in concentrated sulfuric acid to a green-blue solution. It dyes wool in a bath acid with organic acid and mineral acid navy blue tints of very good properties of fastness.

*Example 16*

20.8 parts of the azo-dyestuff of the formula

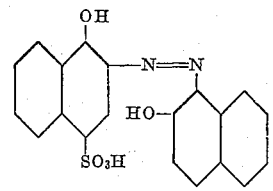

from diazotized 2-amino-1-hydroxynaphthalene-4-sulfonic acid and 2-hydroxynaphthalene are introduced into a freshly prepared chromite solution, made by dissolving 40.4 parts of a chromium hydroxide paste of 8 per cent. strength, corresponding with 3.23 parts of $Cr_2O_3$, by means of 23.8 parts of caustic potash. The mixture is heated for 6 hours at 74–78° C. diluted with 25 parts of water and heated for 10 hours at 74–78° C. It is then diluted with 300 parts of hot water and, if necessary, filtered from undissolved constituents. The filtrate is neutralized with dilute mineral acid and the chromiferous dyestuff salted out; when dry it is a violet-black powder, soluble in water, sodium carbonate solution of 10 per cent. strength and caustic soda solution of 10 per cent. strength, respectively, to a blue-violet solution, and in concentrated sulfuric acid to a blue solution. It dyes wool in a bath acid with organic acid and mineral acid navy blue tints of excellent properties.

*Example 17*

10.45 parts of the azo-dyestuff from diazotized 1-amino-2-hydroxynaphthalene-4-sulfonic acid and 2-hydroxynaphthalene, 5.4 parts of the azo-dyestuff of the formula

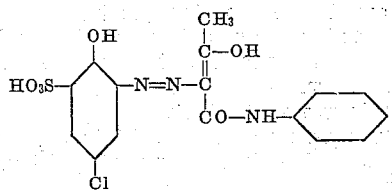

from diazotized 4-chloro-2-amino-1-phenol-6-sulfonic acid and acetic acid anilide and 3.3 parts of the azo-dyestuff of the formula

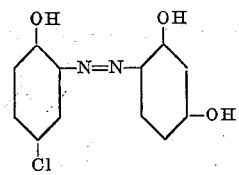

from diazotized 4-chloro-2-amino-1-phenol and 1:3-dihydroxybenzene are introduced into a freshly prepared chromite solution, made by dissolving 42.8 parts of a chromium hydroxide paste of 8 per cent. strength, corresponding with 3.42 parts of $Cr_2O_3$, by means of 25.2 parts of caustic potash. The mixture is heated for 6 hours at 74–78° C. and then for a further 8 hours at 85–90° C. It is then diluted to 300 parts with hot water, if necessary filtered from undissolved constituents and the filtrate neutralized with hydrochloric acid and evaporated to dryness in a vacuum. The new chromiferous dyestuff is a greyblack powder, soluble in water and in sodium carbonate solution of 10 per cent. strength to a blackish red-violet solution; in caustic soda solution of 10 per cent. to a violet-red solution and in concentrated sulfuric acid to a blackish solution. It dyes wool in a bath acid with organic acid and mineral acid violet tints of excellent properties.

What we claim is:—

1. Process for the manufacture of chromiferous dyestuffs, consisting in reacting azo-dyestuffs capable of being chromed with such quantities of alkaline solutions of chromium oxide which contain less than 1 atom of chromium for each group capable of being chromed in the azo-dyestuff.

2. Process for the manufacture of chromiferous dyestuffs, consisting in reacting azo-dyestuffs capable of being chromed of the general formula

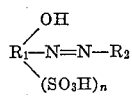

wherein $R_1$ is a naphthalene radical, $R_2$ is a naphthol radical and $n$ is 1 to 3, and wherein the hydroxyl- and the azo-group are in ortho-position to each other, with such quantities of alkaline solutions of chromium oxide which contain less than 1 atom of chromium for each group capable of being chromed in the azo-dyestuff.

3. Process for the manufacture of chromiferous dyestuffs, consisting in reacting azo-dyestuffs capable of being chromed of the general formula

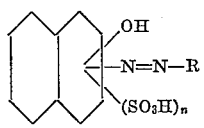

wherein the hydroxyl- and the azo-group are in ortho-position to each other, $n$ is 1 to 3, and R is a naphthol radical, with such quantities of alkaline solutions of chromium oxide which contain less than 1 atom of chromium for each group capable of being chromed in the azo-dyestuff.

4. A process as referred to in claim 3, consisting in carrying out the production of the azo-dyestuffs capable of being chromed and the reaction with the alkaline solutions of chromium oxide in a single stage.

5. Process for the manufacture of chromiferous dyestuffs, consisting in reacting azo-dyestuffs capable of being chromed of the general formula

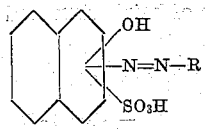

wherein the hydroxyl- and the azo-group are in ortho-position to each other, and R is a naphthol radical, with such quantities of alkaline solutions of chromium oxide which contain less than 1 atom of chromium for each group capable of being chromed in the azo-dyestuff.

6. Process for the manufacture of chromiferous dyestuffs, consisting in reacting azo-dyestuffs capable of being chromed of the general formula

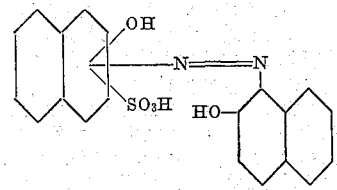

wherein the hydroxyl-groups and the azo-group are in ortho-position to each other, with such quantities of alkaline solutions of chromium oxide which contain less than 1 atom of chromium for each group capable of being chromed in the azo-dyestuff.

7. Process for the manufacture of chromiferous dyestuffs, consisting in reacting the azo-dyestuff of the formula

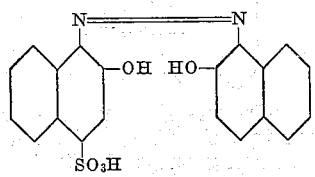

with such quantities of alkaline solutions of chromium oxide which contain less than 1 atom of chromium for each group capable of being chromed in the azo-dyestuff.

8. Chromiferous dyestuffs, obtained from azo-dyestuffs capable of being chromed by reacting these dyestuffs with such quantities of alkaline solutions of chromium oxide which contain less than 1 atom of chromium for each group capable of being chromed in the azo-dyestuffs, which products represent brown to black powders dissolving in water to red, violet and blue solutions and dyeing animal fibers red, violet and blue tints of very good fastness properties.

9. Chromiferous dyestuffs, obtained from azo-dyestuffs capable of being chromed of the general formula

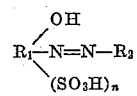

wherein $R_1$ is a naphthalene radical, $R_2$ is a naphthol radical, and $n$ is 1 to 3, and wherein the hydroxyl- and the azo-group are in ortho-position to each other, by reacting these dyestuffs with such quantities of alkaline solutions of chromium oxide which contain less than 1 atom of chromium for each group capable of being chromed in the azo-dyestuff, which products represent brown to black powders dissolving in water to red, violet and blue solutions, and dyeing animal fibers red, violet and blue tints of very good fastness properties.

10. Chromiferous dyestuffs, obtained from azo-dyestuffs capable of being chromed of the general formula

wherein the hydroxyl- and the azo-group are in ortho-position to each other, $n$ is 1 to 3, and R is a naphthol radical, by reacting these dyestuffs with such quantities of alkaline solutions of chromium oxide which contain less than 1 atom of chromium for each group capable of being chromed in the azo-dyestuff, which products represent brown to black powders dissolving in water to red, violet and blue solutions, and dyeing animal fibers red, violet and blue tints of very good fastness properties.

11. Chromiferous dyestuffs as referred to in claim 10, obtained by carrying out the production of the azo-dyestuffs capable of being chromed and the reaction with the alkaline solutions of chromium oxide in a single stage, which products represent brown to black powders dissolving in water to red, violet and blue solutions, and dyeing animal fibers red, violet and blue tints of very good fastness properties.

12. Chromiferous dyestuffs, obtained from azo-dyestuffs capable of being chromed of the general formula

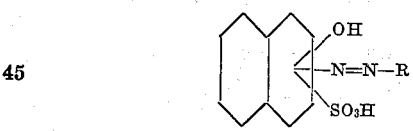

wherein the hydroxyl- and the azo-group are in ortho-position to each other, and R is a naphthol radical, by reacting these dyestuffs with such quantities of alkaline solutions of chromium oxide which contain less than 1 atom of chromium for each group capable of being chromed in the azo-dyestuff, which products represent black powders dissolving in water to blue solutions and dyeing wool blue to navy blue tints of very good fastness properties and excellent appearance in the artificial light.

13. Chromiferous dyestuffs, obtained from azo-dyestuffs capable of being chromed of the general formula

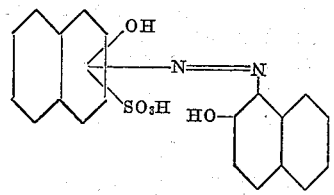

wherein the hydroxyl-groups and the azo-group are in ortho-position to each other, by reacting these dyestuffs with such quantities of alkaline solutions of chromium oxide which contain less than 1 atom of chromium for each group capable of being chromed in the azo-dyestuff, which products represent black powders dissolving in water to blue solutions and dyeing wool blue to navy blue tints of very good fastness properties and excellent appearance in the artificial light.

14. Chromiferous dyestuffs, obtained from the azo-dyestuff capable of being chromed of the formula

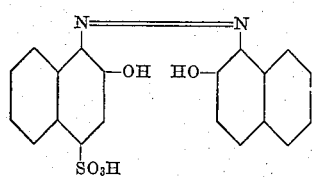

by reacting this dyestuff with such quantities of alkaline solutions of chromium oxide which contain less than 1 atom of chromium for each group capable of being chromed in the azo-dyestuff, which products represent black powders dissolving in water to blue solutions, and dyeing wool blue to navy blue tints of very good fastness properties and excellent appearance in the artificial light.

FRITZ STRAUB.
HERMANN SCHNEIDER.